June 21, 1949.　　　　F. BURCHELL　　　　2,473,857
APPARATUS FOR INSERTION IN COLOR DISPLAY DEVICES UTILIZING POLARIZED
LIGHT FOR SECURING CHANGING SATURATION OF SPECIFIC
HUES IN FIXED ZONES AS VIEWED BY OBSERVERS Filed Dec. 5, 1946　　　　　　　　　　　　　　　2 Sheets-Sheet 1

INVENTOR.
FFORD BURCHELL
BY
Kenyon + Kenyon
ATTORNEYS

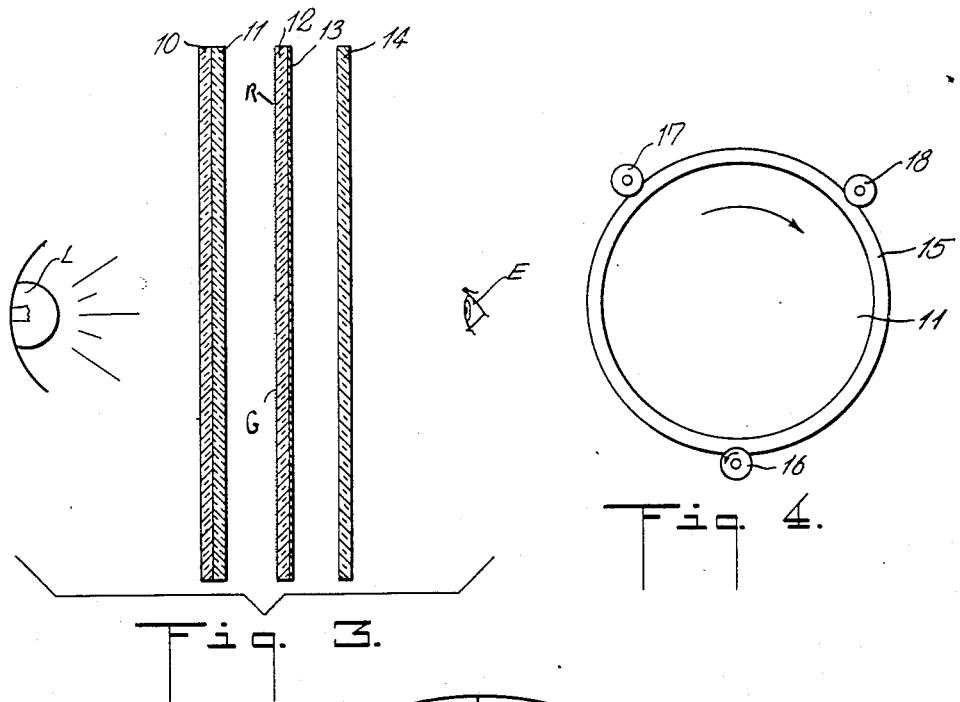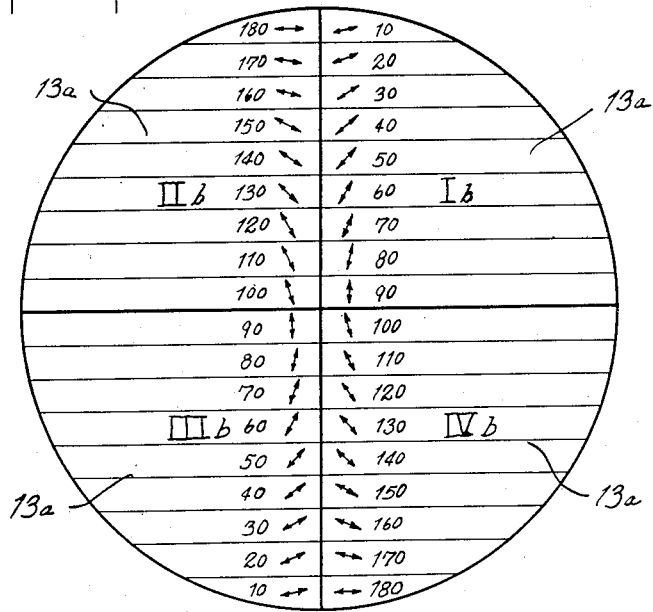

Patented June 21, 1949

2,473,857

UNITED STATES PATENT OFFICE 2,473,857

APPARATUS FOR INSERTION IN COLOR DISPLAY DEVICES UTILIZING POLARIZED LIGHT FOR SECURING CHANGING SATURATION OF SPECIFIC HUES IN FIXED ZONES AS VIEWED BY OBSERVERS

Fford Burchell, New York, N. Y., assignor to Burchell-Holloway Corporation, New York, N. Y., a corporation of New York Application December 5, 1946, Serial No. 714,330

2 Claims. (Cl. 88—65)

This invention relates to color display devices, and more particularly to means therein for securing hues of changing saturation.

In color display devices of known types, it is possible to secure multi-color variation by interposing designs of specific material between a pair of polarizing sheets located in front of a light source and by rotating one of the sheets in its plane while viewing the design.

An object of the invention is to provide color devices in which it is possible to secure as a result to the observer, views of specific hues whose saturation varies without change in hue.

Another object of the invention is to provide means whereby the change in hue saturation is accomplished periodically with the optical result of apparent flow from one point to another in a plane surface.

Still another object of the invention is to provide means for securing variation in hue saturation in plane surfaces.

Another object of the invention is to provide simple means for securing the foregoing which may be manufactured quickly at low cost.

To the accomplishment of the foregoing and such other objects as may hereinafter appear, the invention consists in the novel construction and arrangement of parts hereinafter to be described and then sought to be defined in the appended claims, reference being had to the accompanying drawing forming a part hereof, which shows merely for the purposes of illustrative disclosure, preferred embodiments of the invention, it being expressly understood, however, that changes may be made in practice within the scope of the appended claims without digressing from the inventive idea.

In the drawing:

Fig. 3 is a diagrammatic sectional view of a device adapted to effect variation in hue saturation;

Fig. 4 is a rear view of the device of Fig. 3 taken in front of the light source and viewed toward the right of Fig. 3; and Fig. 5 is an elevational view of a modified form of hue saturation varying means.

Figure 1:
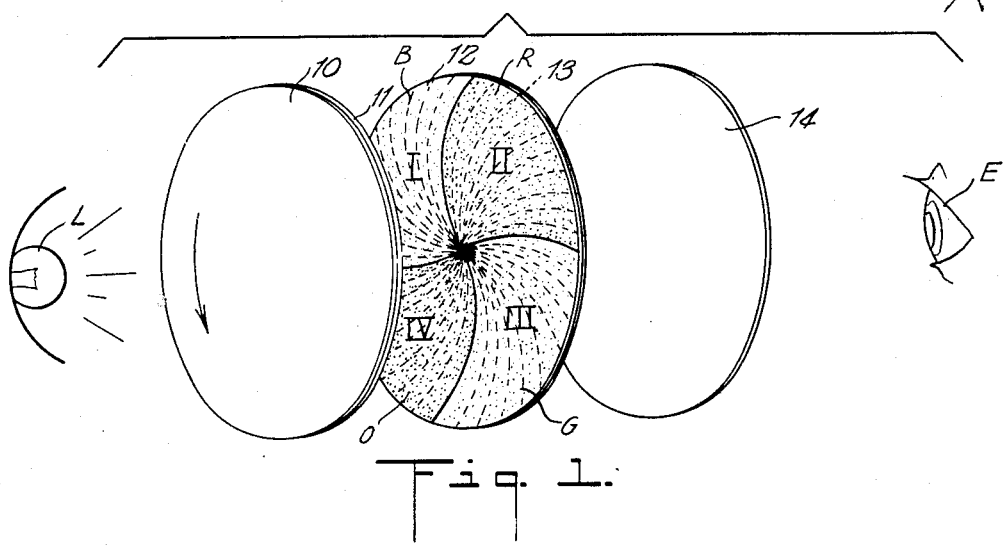
Fig. 1 is a diagrammatic perspective view of one form of the invention.

Referring to the drawing 10 denotes a sheet of translucent isotropic material such as matte cellulose acetate or thermoplastic vinyl resins or any other non-polarizing translucent material. A sheet 11 of polarizing material is secured to or located in front of the sheet 10. Preferably the sheets 10 and 11 are secured together by an isotropic translucent cementitious material as liquid cellulose acetate or thermoplastic vinyl resins or the like. They may, however, be separate, or sheet 10 may be eliminated if the sheet 11 is translucent.

A second sheet 12 of matte cellulose acetate or other non-polarizing material is provided and positioned to lie in front of the sheet 11. Areas I, II, III and IV of one face of this sheet have applied thereto non-polarizing transparent or translucent filters such as paints R, B, G, and O of different colors or hues. In the alternative color filters of isotropic material tinted to desired color may be applied to sheet 12. As shown herein the sheet 12 is circular and each of the zones or areas I, II, III and IV constitutes substantially a quadrant of the circule. The non-polarizing colored filter applied in quadrant I is, for example, red, that in quadrant II, blue, that in quadrant III, green, and that in quadrant IV, orange. Any other colors may be used and any other zoning division of the surface of sheet 12 may be made. The important factor is that each area or zone has a transparent non-polarizing paint or other color filter of a specifically chosen color applied to it or that other means for transmitting polarized light of a specific hue through each zone be provided. One or more areas or zones I, II, III or IV may be provided.

The other face of sheet 12 is subdivided into one or more areas or zones Ia, IIa, IIIa, IVa corresponding in shapes and number with the similar zones or areas in its first named face and positioned to lie in alignment therewith. Each zone in turn is subdivided into sections and each section has birefringent material 13 applied thereto. The birefringent material consists preferably of regenerated cellulose tape. Such tape is regenerated cellulose with a pressure sensitive isotropic adhesive on one surface. In such regenerated cellulose tape the direction of vibrations in the two rays arising from a normally incident beam are substantially parallel and perpendicular to the edge of the mill roll. The regenerated cellulose being birefringent has a so-called "signficant axis or direction." This refers to the projection onto its surface of the direction of vibration of the light of that one of the two rays which is propagated most rapidly.

Figure 2:
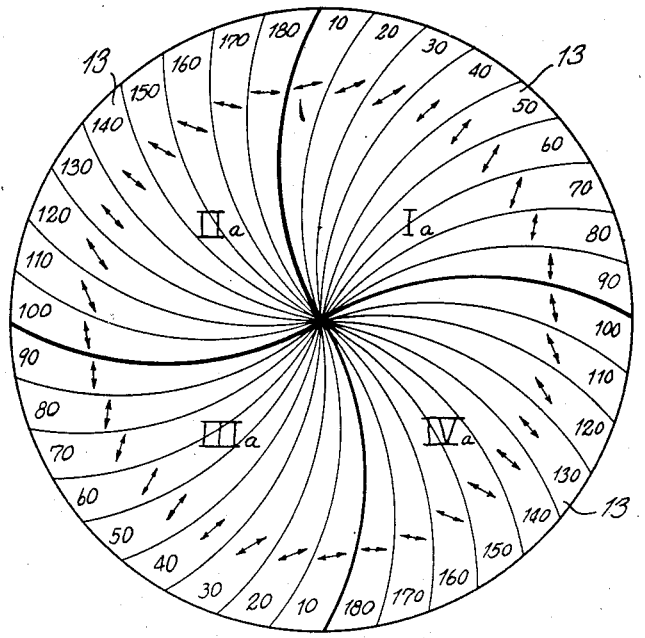
Fig. 2 is an elevational view of the hue saturation varying element of the device of Fig. 1.

Over the area Ia of sheet 12 corresponding to the area I on its opposite face and in the successively adjacent sections of that area the strips 13 of birefringent material such as regenerated cellulose tape are applied. The angles of orientation of the significant axes or directions of the strip 13 are progressively and preferably regularly different. For example, a progressive variation of 10° in angles of orientation of the significant axes or directions of the strips applied in successive sections of the area Ia may be used. The arrows in Fig. 2 denote diagrammatically the respective significant axes or directions and their progressive change or variation in 10° steps from 0° to 90°. This 10° variation, however, is merely exemplary as other desired angles of progression or variation may be selected. In the embodiment shown the uppermost strip in zone Ia has its significant axis at 10° with the horizontal, the next section at 20° therewith and so on through to 90° for the last of the strips in the zone Ia in the clockwise direction.

Similarly the strips 13 of birefringent material in zone IIa are oriented at successively increasing angles of 10° in the clockwise direction as are those in zones IIIa and IVa.

The particular shape of the strips or elements 13 can be anything desired. They may have the petal like radially extending form shown in Fig. 2. As an alternative, strips or elements 13a may be arranged as shown in Fig. 5. Therein strips 13a in zone Ib are all horizontal and successive strips progressively from top to bottom range in angles of orientation of their significant axes from 10° to 90°. In zone IIIb the arrangement is opposite. In zones IIb and IVb the angles of orientation of the significant axes of the uppermost strips 13B are respectively horizontal and at 100° therewith and the angle of orientation of successive strips in the downward direction changes by 10° to the lowermost strips whose angle of orientation with the horizontal are respectively 10° and 180° for their significant axes. One or more layers of the birefringent material may be used in each strip location.

A great number of varieties of combinations may be provided in the shapes and number of the zones, the shapes of strips or elements in each zone, and in the direction of change in angular orientation of adjacent strips in each section. The principal factor is that in each zone of sheet 12 corresponding to a color zone provided on the other face of sheet 12, there should be sections of birefringent material arranged side by side having progressively different angles of orientation of their significant axes. The sheet 10 and color filters R, B, G and O could be replaced by other means for delivering polarized light of specific hue to each of the zones Ia, IIa, IIIa, IVa, etc., of sheet 12 if desired.

Shrinkage of the birefringent strips 13 or 13a which would leave gaps between adjacent strips that would produce disturbing effects can be prevented by laminating a coating of isotropic material such as thermoplastic vinyl resins, cellulose acetate or other isotropic material over the strips to seal them from atmosphere.

A sheet 14 of polarizing material is positioned to lie in front of the sheet 12. This polarizing sheet, called an analyzer, is arranged to be fixed in its plane.

The sheets 10 and 11 are supported for rotation in their planes. They, for example, are supported in a frame 15. The latter is carried by grooved rollers 16, 17 and 18 arranged about its periphery. One of these rollers, for example 16, is driven in conventional manner so that the frame 15 rotates and consequently rotates polarizing sheet 14 in its own plane. The birefringent strips preferably lie on the face of sheet 12 nearest sheet 14.

As a result, the beams of light from the light source L traversing the first polarizing sheet 11, the sheets 12 or 12a carrying the birefringent strips 13 or 13a, and the second polarizing sheet or analyzer 14 reach the eye E as polarized light. The particular colors imparted to the zones I, II, III, IV, by the isotropic filters or paint in these zones on sheet 12 are visible to the eye of the observer. However, as the polarizing sheet 11 is rotated the changing angle of polarization of that sheet relative to the fixed angle of polarization of polarizing sheet 14 together with the progressive changes in angle of orientation of the birefringent strips in each zone results in a novel optical effect which primarily is a progressive variation in color saturation in each zone. In other words, the dominant color of each zone seen by the eye remains that imparted by the filter or paint in the particular zone of sheet 12. However, the saturation of that color progressively waxes and wanes as the polarizing sheet 11 is rotated without any color change in the zone. This novel effect gives an illusion of motion and results in an attractive color display device. It can be utilized with other optical effects if desired.

The novel effect described will be substantially the same if the light source and the eye positions are interchanged, or if the analyzer sheet 14 is rotated instead of rotating polarizing sheet 11. In other words, it is immaterial which one of the two polarizing sheets 11 or 14 is rotated. Likewise, if desired, sheet 12 can be eliminated and the birefringent elements or strips 13 or 13a can be applied directly to the polarizing sheet 11 or to the polarizing sheet 14 to lie between these two sheets. If this is done these strips are arranged upon either of these polarizing sheets in exactly the same manner as their arrangement upon sheet 12. In such event, the color filters R, B, G and O preferably should be translucent, and be applied to sheet 11 directly below the strips 13.

While specific embodiments of the invention have been disclosed, it is to be understood that combinations embodying the features herein disclosed are possible in great numbers and varieties and are contemplated. There is no intention of limitation to the exact details shown and described.

What is claimed is:

1. A device of the character described for producing the optical effect of changing color saturation in a zone of specific color as viewed by an observer upon its interposition between a light polarizer and a light analyzer one of which is rotatable in its plane comprising an isotropic sheet, a color filter of a chosen specific color applied directly to a zone of said sheet, and a plurality of strips of birefringent material applied side by side to said isotropic sheet in said zone and substantially coextensively with the color filter, said birefringent strips having uniform progressively different angles of orientation of their significant axes, whereby light transmitted through the sheet, color filter and strips from a light source behind the polarizer to the observer in front of the analyzer always has a specific hue in the zone of the chosen specific color of the filter, the saturation of said hue, however, varying progressively in said zone as either the polarizer or analyzer is rotated in its plane.

2. A device of the character described for producing the optical effect of changing color saturation in a zone of specific color as viewed by an observer upon its interposition between a light polarizer and a light analyzer one of which is rotatable in its plane comprising a substantially isotropic sheet of light transmitting material, a substantially isotropic paint of chosen specific hue applied to a zone of said sheet, and a plurality of strips of birefringent material permanently applied side by side to said sheet in said zone and substantially coextensively with said paint in said zone, said birefringent strips having substantially uniform width, each strip having the same significant axis of birefringence in its length, said birefringent strips having uniform progressively different angles of orientation of their significant axes, whereby light transmitted through the sheet, paint and strips from a light source behind the polarizer to the observer in front of the analyzer appears to said observer in the said zone at all times to have the specific hue of said paint, the saturation of said hue, however, varying progressively in the zone as either the polarizer or analyzer is rotated in its plane.

FFORD BURCHELL.

REFERENCES CITED

The following references are of record in the file of this patent:

UNITED STATES PATENTS

| Number | Name | Date |
|---|---|---|
| 2,122,225 | Wheelwright | June 28, 1938 |
| 2,123,743 | Pratt | July 12, 1938 |
| 2,146,962 | Land | Feb. 14, 1939 |
| 2,169,022 | Chubb | Aug. 8, 1939 |
| 2,261,957 | Burchell | Nov. 11, 1941 |
| 2,313,831 | Martin | Mar. 16, 1943 |
| 2,393,968 | Burchell | Feb. 5, 1946 |
| 2,393,969 | Burchell et al. | Feb. 5, 1946 |

OTHER REFERENCES

Wright: Text on Light, publication, 1892, MacMillan & Co., New York, pages 272–274, 289, 296, 313, Plate III opposite page 160 and Plate IV opposite page 272.